United States Patent
Le Pennec et al.

(10) Patent No.: US 6,920,488 B1
(45) Date of Patent: Jul. 19, 2005

(54) SERVER ASSISTED SYSTEM FOR ACCESSING WEB PAGES FROM A PERSONAL DATA ASSISTANT

(75) Inventors: Jean Francois Le Pennec, Nice (FR); Jean-Charles Cueff, Villeneuve-Loubet (FR); Alain Benayoun, Cagnes sur Mer (FR); Patrick Michel, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 09/627,741

(22) Filed: Jul. 28, 2000

(30) Foreign Application Priority Data

Jan. 6, 2000 (FR) .......................................... 00480013

(51) Int. Cl.⁷ .............................................. G06F 15/16
(52) U.S. Cl. ...................... 709/219; 709/202; 709/246; 715/744; 715/746; 715/747
(58) Field of Search ................................ 709/219, 202, 709/246; 715/744–747; 345/744–747, 760, 762, 769; 340/755, 7.55, 7.56

(56) References Cited

U.S. PATENT DOCUMENTS

| | | | | |
|---|---|---|---|---|
| 6,029,182 | A | * | 2/2000 | Nehab et al. ............... 715/523 |
| 6,148,330 | A | * | 11/2000 | Puri et al. ................... 709/217 |
| 6,182,122 | B1 | * | 1/2001 | Berstis ....................... 709/217 |
| 6,195,696 | B1 | * | 2/2001 | Baber et al. ................ 709/223 |
| 6,209,007 | B1 | * | 3/2001 | Kelley et al. ............... 715/513 |
| 6,272,493 | B1 | * | 8/2001 | Pasquali ...................... 707/10 |
| 6,278,449 | B1 | * | 8/2001 | Sugiarto et al. ............ 345/826 |
| 6,351,761 | B1 | * | 2/2002 | Cantone et al. ............. 709/202 |
| 6,412,008 | B1 | * | 6/2002 | Fields et al. ................ 709/228 |
| 6,446,109 | B2 | * | 9/2002 | Gupta ......................... 709/203 |
| 6,516,349 | B1 | * | 2/2003 | Lieberman .................. 709/225 |
| 6,539,423 | B1 | * | 3/2003 | Ebert .......................... 709/219 |
| 6,564,251 | B2 | * | 5/2003 | Katariya et al. ............. 709/214 |
| 6,594,682 | B2 | * | 7/2003 | Peterson et al. ............ 709/102 |
| 6,766,163 | B1 | * | 7/2004 | Sharma .................... 455/412.1 |
| 2001/0032092 | A1 | * | 10/2001 | Calver ............................ 705/1 |
| 2002/0015057 | A1 | * | 2/2002 | Park ........................... 345/738 |
| 2002/0023230 | A1 | * | 2/2002 | Bolnick et al. ............. 713/202 |

OTHER PUBLICATIONS

Anupam et al., "Personalizing teh Web Using Site Descriptions," Sep. 3, 1999, Proceedings: Tenth International Workshop on Database and Expert Systems Applications, 1999, pp. 732–738.*

Frick, WAP—Designing for Small User Interfaces, SAP AG, Corporate Research, Pervasive Computing Group and Albrecht Schmidt, Telecooperation Office, Univ. of Karlsruhe, from http://www.sapdesignguild.org/editions1/print_wap-design1.html, pp. 1–4, undated.*

Sanchez, Lucent, Netxcape Develop Portal for Mobile Devices, May 6, 1999, from CNN's Web Site, http://www-cgi.cnn.com/TECH/computing/9905/06/zingo.idg/index.html, pp. 1–2.*

Spring, The Battle of the Browser Sidekicks, Jul. 29, 1999, from CNN's Web Site, http://www-cgi.cnn.com/TECH/computing/9907/29/sidekicks.idg/, pp. 1–4.*

* cited by examiner

*Primary Examiner*—Bradley Edelman
(74) *Attorney, Agent, or Firm*—Jerry W. Herndon, Esq.; Steven M. Greenberg, Esq.; Christopher & Weisberg, P.A.

(57) ABSTRACT

Server assisted system for accessing web page fields comprising a wireless Personal Data Assistant (PDA) communicating with the Internet by the intermediary of a wireless Internet gateway and a portal server capable of accessing the resources of the Internet such as servers. The portal server comprises a data base containing at least identifying information enabling fields of web pages selected by the user to be retrieved, and portal handling means for accessing the selected web page fields, and the PDA comprises portal browsing means for browsing the selected web page fields and retrieving at least one of them and display means for displaying the retrieved web page field.

11 Claims, 6 Drawing Sheets

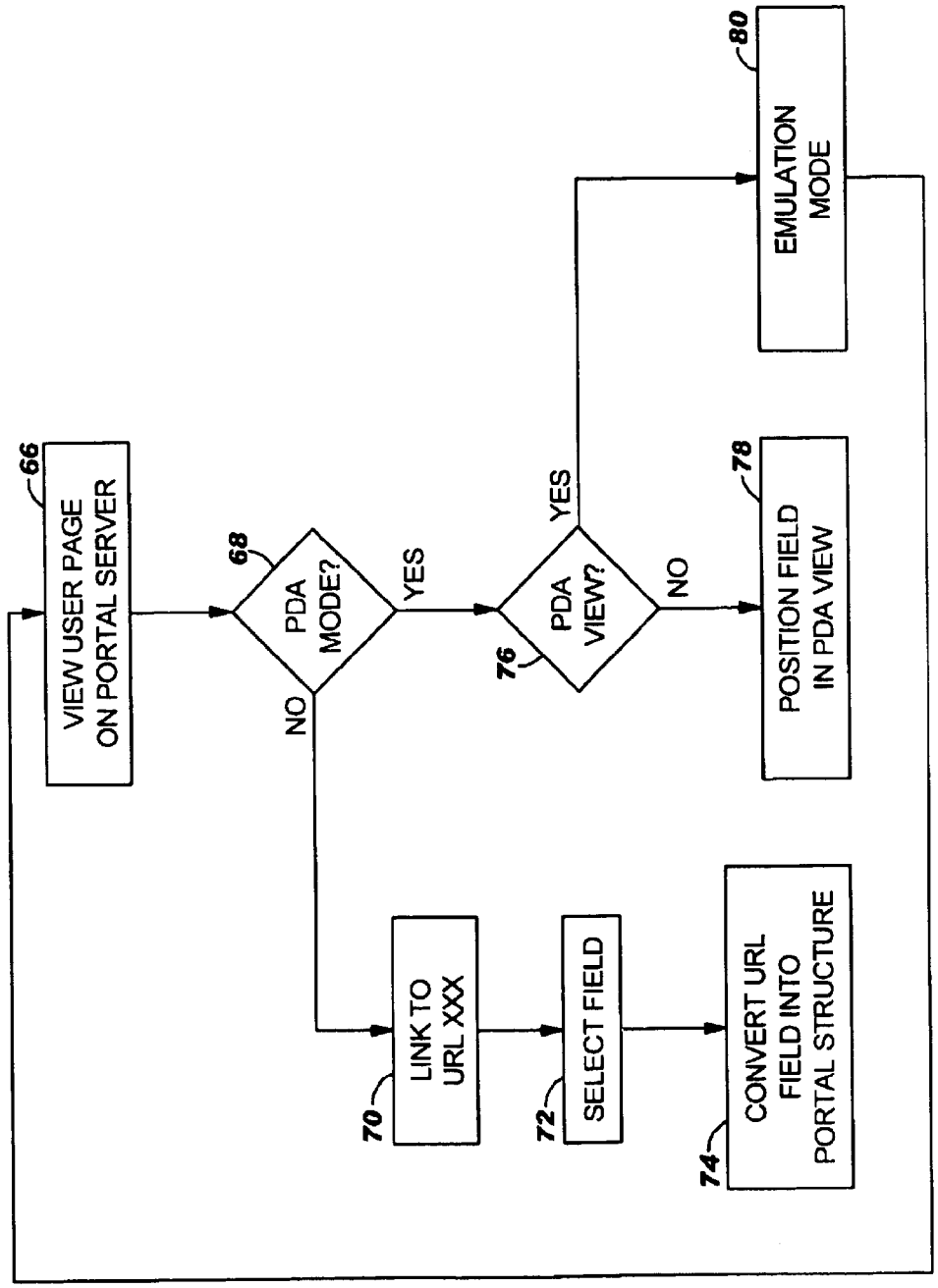

SERVER ASSISTED SYSTEM FOR ACCESSING WEB PAGES FROM A PERSONAL DATA ASSISTANT

BACKGROUND OF THE INVENTION

The present invention relates to data communication systems wherein a Personal Data Assistant (PDA) enables the user to access the Internet network capabilities and relates in particular to a server system for accessing web pages from a PDA.

A Personal Digital Assistant which is a simple and small device fitting in the pocket, combines the portability of the traditional day planner with the connectivity of a Personal Information Manager(PIM) providing a day planner in a computer. The PDA does a lot more than keeping a schedule up-to-date. Rather, the PDA can share data, write notes, schedule meetings, track expenses, or compose e-mail, and play games. The PDA further can sync a desktop computer so it is not necessary to duplicate data entry efforts.

Now, for getting more information, it is necessary to have access to the Internet network and to use a web browser. But a high definition screen is required to use it properly and needs also a large amount of data transfer. It is not possible today to use this standard web browsing method from a PDA even if some improvements have been made. However, even if the PDA cannot afford the full quality of a computer, the amount of information being transmitted could be reduced because what is needed is clean, pure information delivered instantly.

It is at present possible to use the handheld-device markup language (HDML) which offers an alternative to the hyper-text markup language (HTML) used today on Web servers/browsers. HDML offers the power of pure information access within the context of the extreme interface limitations of the devices it is designed for. A PDA with integrated or external connection to a cell phone has an IP address and a browser build in. When the PDA is switched on, a menu comes up displaying the feature set (information services, address book, e-mail, etc.) Jumping into information services, a list of usual categories: news, weather, and sports can be accessed. When an information provider is selected, the phone sends a request over the cellular packet network, which arrives at a sort of proxy server at the wireless service. It passes the request off to the contents provider as a simple HTTP request. The contents provider sends back the appropriate HDML file, and it shows up on the phone's tiny screen. The use of HDML as described herein, however, limits the number of web locations which can be looked at.

Instead of web surfing, the PDA can use another alternative technique known as web clipping. When web clipping, the extraneous parts of the browsing process are extracted in an effort to minimize power usage and storage requirements. This technique requires partnering with an array of contents providers, which must design special query pages for shipment with the PDA. These pages are smaller (clipped) versions of pages which are available on regular web sites and they will enable the device to send and receive the smallest possible amount of data.

It must be noted that there is now a custom portal which is defined by the user, and which is specifically adjusted to the user business inasmuch as it can be tailored to meet the user specific requirements such as data base access, directories, business research engines, tools, stocks, weather and other resources. Unfortunately, such a facility can be defined only with a computer.

SUMMARY OF THE INVENTION

Accordingly, the main object of the invention is to provide a system enabling a PDA user to receive within the PDA any up-to-date information from the web that has been selected directly by the user.

Another object of the invention is to provide a system for retrieving data from the web in order to display the retrieved data in the PDA and more particularly for defining screen positions in the PDA with defined data areas from web pages.

BRIEF DESCRIPTION OF THE DRAWINGS

The above and other objects, features and advantages of the invention will be better understood by reading the following more particular description of the invention in conjunction with the accompanying drawings wherein:

FIG. 5 is a flow chart of the steps which can be used in the portal server to select web

DETAILED DESCRIPTION OF THE PREFERRED EMBODIMENT

Figure 1:
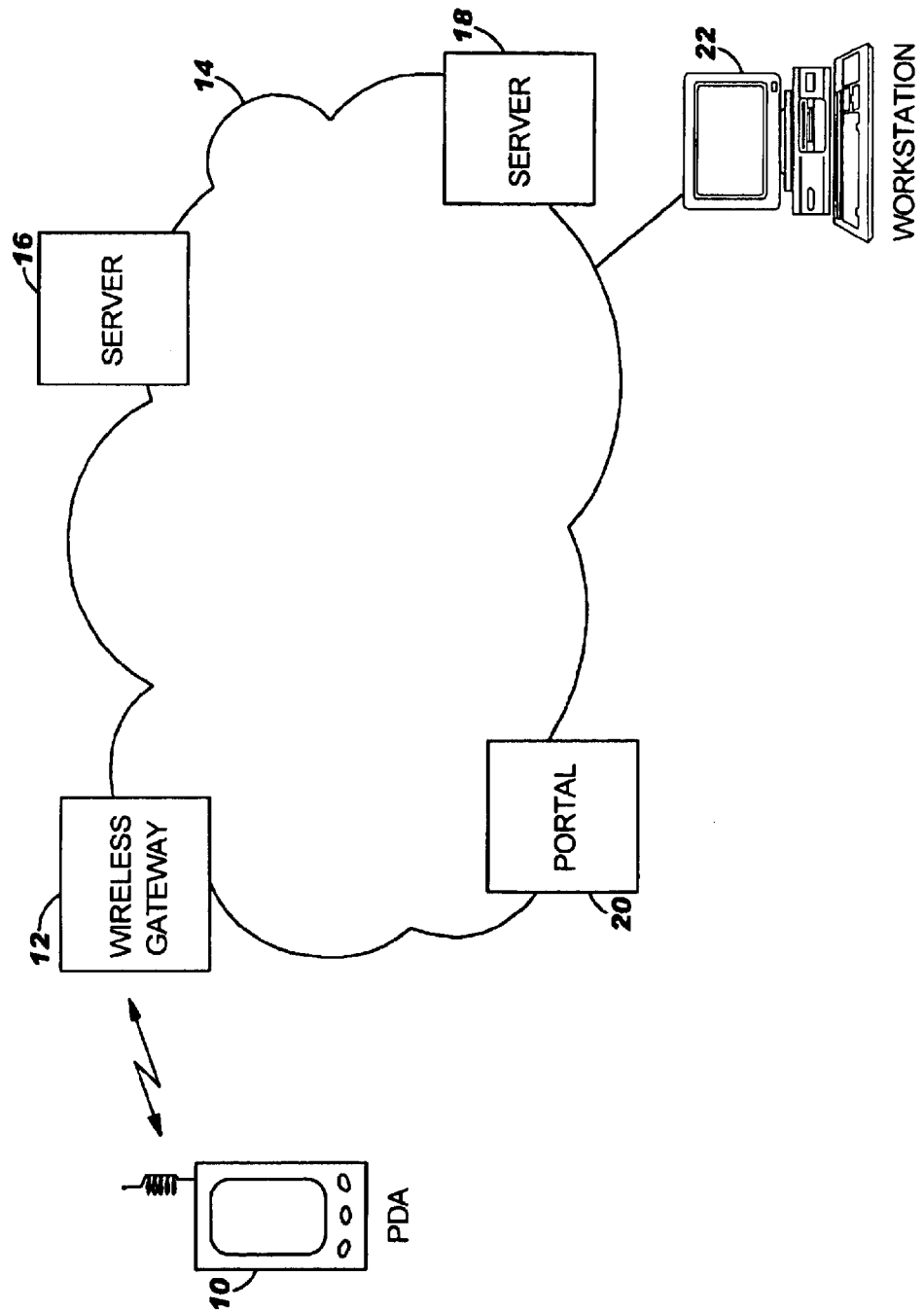
FIG. 1 is a schematic view of a system including a PDA and a portal server connected to the Internet network according to the principles of the invention.

As illustrated in FIG. 1, a wireless PDA 10 which can have an integrated wireless interface or a link to a wireless phone has a wireless connection to a wireless gateway 12. Intermediate equipment such as base transceiver (BTS) station providing the RF interface, base station controller (BSC) or Mobile switching center (MSC) are not shown as they just act as a transmission media between the wireless PDA 10 and the interface Gateway 12.

The wireless gateway 12 is used to enter a WAN such as Internet network 14. It may be linked to all servers of the network such as servers 16, 18 by the intermediary of a portal PDA server 20. The custom portal PDA server 20 may be contacted from any workstation 22 coupled to the web. Access to the custom portal PDA server 20 can include secure access such as logon, password, or certificate services included within the workstation 22. It is also a method of the invention to use coordinates from a GPS device linked or integrated into the PDA to request a map of the area from where the user is or routing information. Notably, the coordinates may also be given in some areas by a wireless phone carrier which can correlate level of signals from different BTS stations and can produce an approximate position of the calling device.

Figure 2:
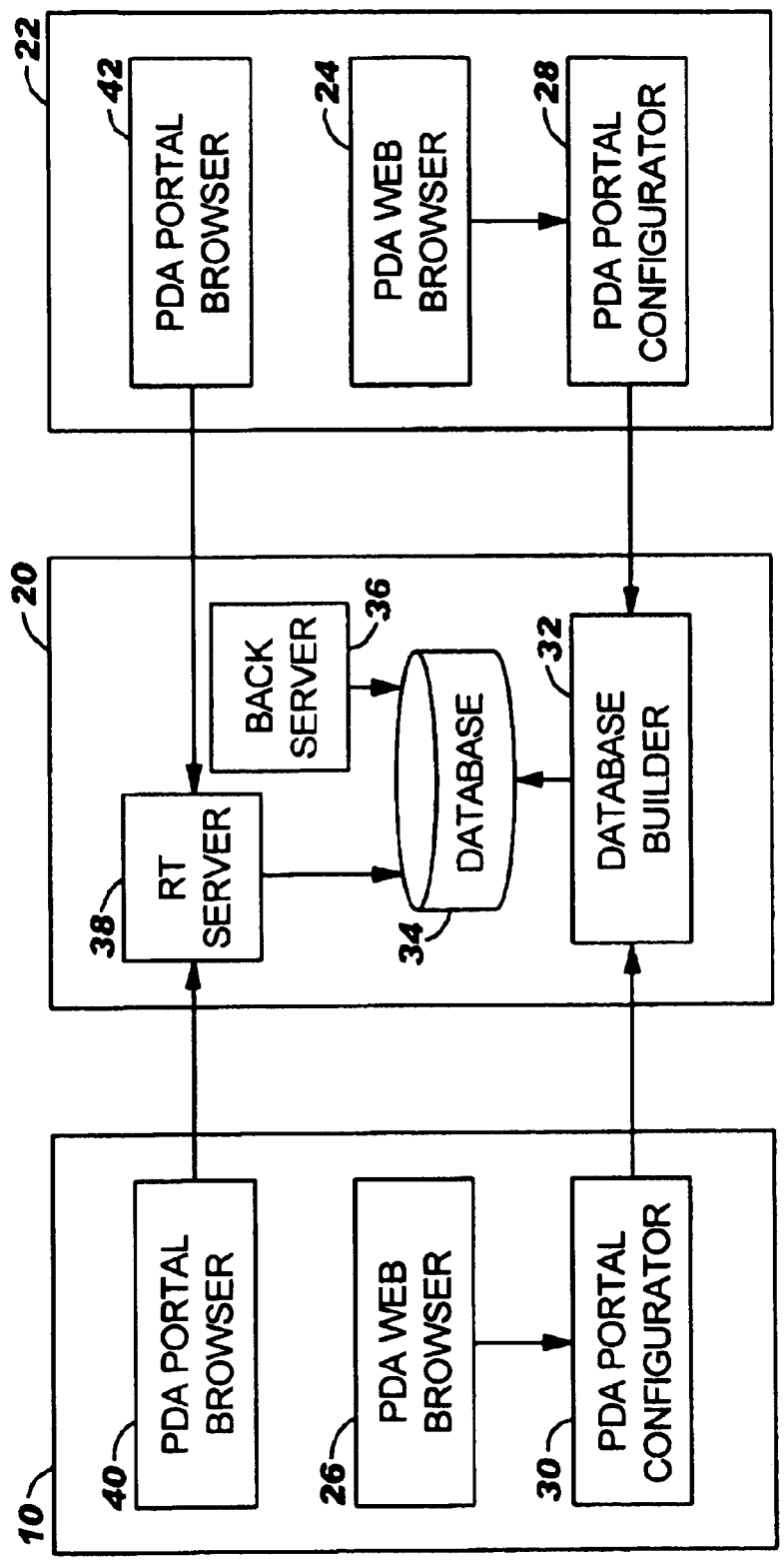
FIG. 2 is a block-diagram representing the main components of the PDA, the portal 15 server and the user workstation, and the operating links therebetween.

FIG. 2 is a block diagram representing the three main components of the system according to the invention that is PDA 10, portal server 20, user workstation (generally a PC) 22, and the different links and interactions between them. The web servers on which the information is taken are not represented but are accessed for creating portal pages by the following software components: Both PC web browser 24 and PDA web browser 26, the former being a standard browser and the latter being a simplified browser, show text of the web pages first as the view capabilities are limited on a PDA. Second, the PC web browser 24 and the PDA web browser 26 show one by one the possible images of the web page so that the items to be added to the portal browser can be selected. Still, the main way to build portal pages remains using the PC web browser 24.

When a web page is accessed using a web browser, part of the visible web page may be copied into a portal page using the PC portal configurator 28 or PDA portal configurator 30 depending on which device the user works. The portal configurator 28 or 30 has the function of configuring the selected web page fields for using them in portal server 20 and then gives the configured data to a portal database builder 32 which will ask for user definitions such as update method (real time or background task update), position, and put all the information for the user into portal database 34.

The handling means of the portal server 20 comprises a portal back server 36 and a portal real time (RT) server 38. The function of the portal back server 36 is to update regularly the view field of data base 34 in order to provide a faster download when a PDA portal browser 40 (in PDA 10) or a PC portal browser 42 (in workstation 22) requests a portal page. Email, meteorological information, and news do not require a real time view and may be pre-stored by regular updates to the portal database 34. In order to achieve the foregoing, the portal back server 36 acts as a background task which analyzes all elements within the database 34 and updates fields set for regular refresh with a period defined so as to maintain an updated database. Other information such as stocks values require real time updates and, consequently, can be requested from the source web server by the portal RT server 38 when a portal browser activates the request.

When the portal RT server 38 receives a request to download a portal page, the portal RT server 38 first can look at the portal database 34 and it can directly take view fields from the portal database 34 which have been updated by the portal back server 36. Additionally, the portal RT server 38 can start the download of these view fields to the requesting browser. In parallel, real-time defined fields can initiate contact with related URLs (web pages) to get the corresponding fields which are then downloaded to the requesting browser. This page loading mechanism can accelerate the downloading and appearance of data on the browser screen as this method differs from the classical web page browsing that downloads data as the data appears in order in an HTML document.

Figure 3:
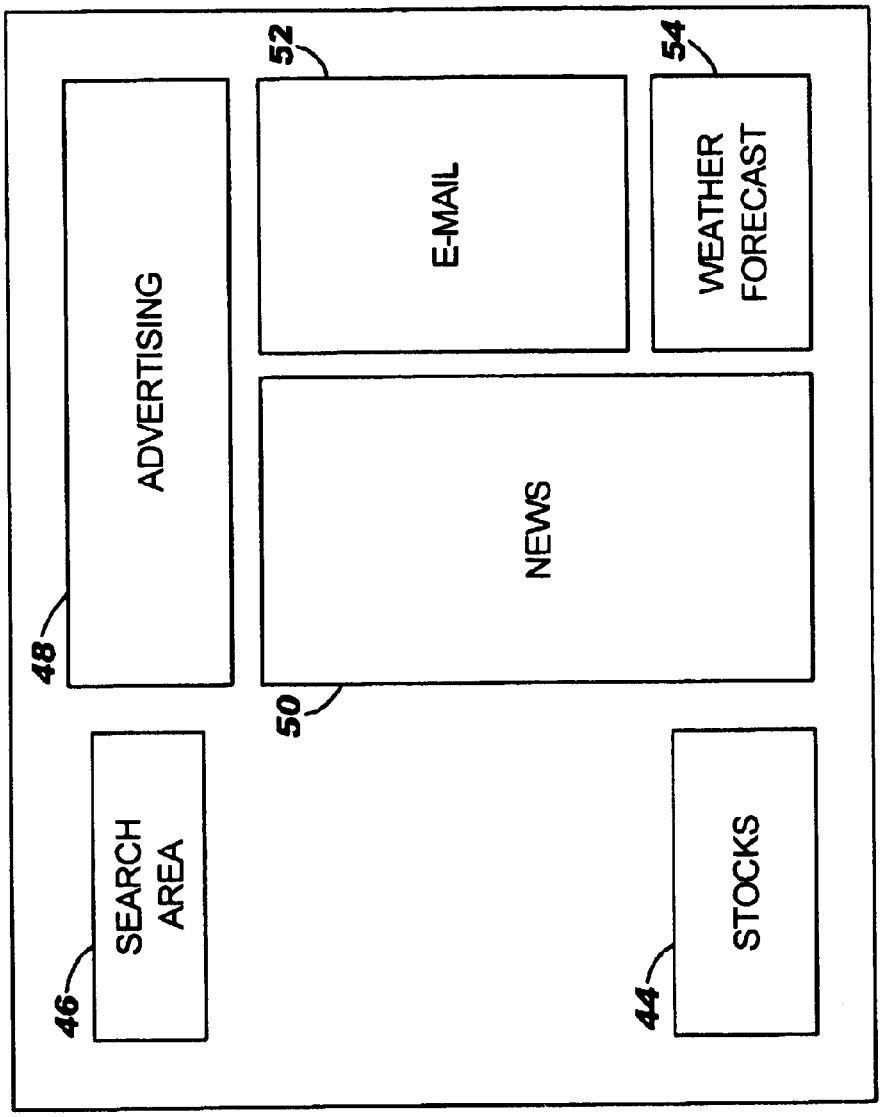
FIG. 3 is a schematic view of the fields to be displayed on the PDA as they are scheduled in the portal server.

In the preferred embodiment, the portal server 20 can be accessed by a user through workstation 22 to build web pages, such a page being illustrated in FIG. 3. This page may be built using a current portal design in the HTML language, but the page also can be built using cut and paste techniques with content from other web pages. For example, a stock web server page may be activated each time the user requests its portal page and a portion of the screen on the stock web server page will be copied onto the stock area 44 of the user web portal view. The cut and paste method can be bitmap, text or HTML depending on the type of data it includes, but this is managed directly by the cut and paste function. Using this method, the user can build the user's own portal page that will also include as an example a search area 46 on a search engine, some advertising 48 that the user want to see on the web portal, the day news 50, its e-mail 52 and weather forecast 54. The remaining information on the screen is text or graphic that the user never wants to see on in the user's PDA.

Figure 4A:
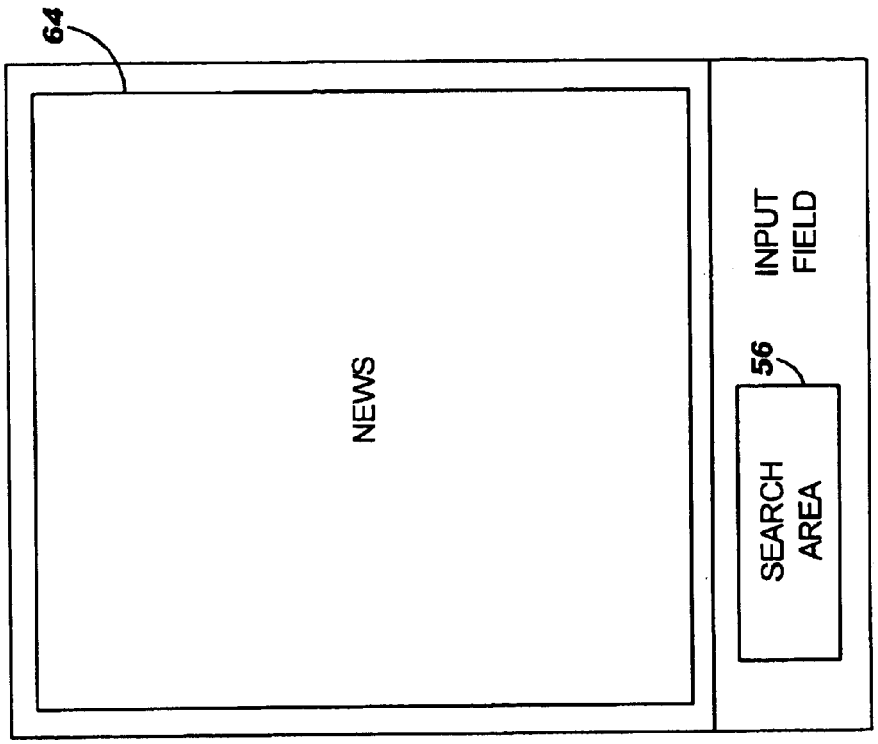
FIGS. 4A and 4B are respectively two consecutive screens which can be displayed on the screen of the PDA using the fields to be displayed as defined in FIG. 2.

FIG. 4A is a schematic illustration of the information displayed on PDA 10. All of the fields that were defined on the user web portal view are available except for the advertising field 48 which is not necessary on this screen, but which can be called using its reference number on another screen. Assuming that the PDA has a separate input and output fields, the search area 46 from the web portal view is moved to the input field which creates a search area 56. The other areas can be placed in the output field including Stocks 58, E-mail 60, Weather forecast 62 and news 64. Each of these fields may be selected for viewing alone on the screen either by selecting the field by the pen of the PDA, or otherwise identifying the input field depending upon the capabilities of the PDA. By presenting a field for viewing along, more details regarding the field can be provided, or a special subfield can be selected in the field.

Figure 4B:
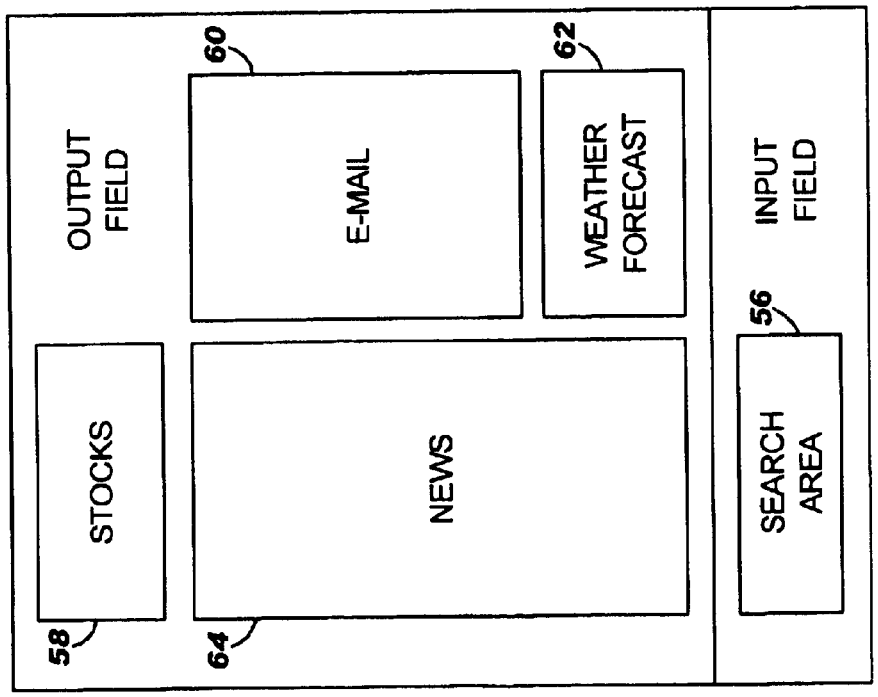

As an example, this is the case when selecting news 64, which will open the screen illustrated in FIG. 4B with only the news 64 in full screen mode. The input area in that case which contains the search input field 56 can perform a search on the news. The process explaining how further information is shown is detailed in the following description. The behavior of the PDA can be simulated on the portal server using a normal web browser. A web page further can demonstrate the operability of the PDA screen and buttons. Moreover, by using the mouse instead of the pen, it can be verified that the constructed fields definition are working as designed.

FIG. 5 is a flow-chart representing the steps of selecting information to be added on a portal server page using a PC web browser 24 in workstation 22. The first thing to do when using a PC web browser is to select a URL (Uniform Resource Locator) address of the page or sub-page. Uniform Resource Locators are short strings that identify resources in the web such as documents, images, downloadable files, services, electronic mailboxes, and other resources. The user will be able to see this page on its screen (step 66). The user can then select either the PC browser mode or the PDA browser mode (step 68). When the PC browser mode is selected, it is then possible to go to other URL locations (step 70) in the Internet network to extract information to be put on both PDA and portal.

When the user is on this URL, he can select any field (step 72) on the screen using the mouse. Then, this field position is correlated with the HTML file of the current page to identify the type of information that is defined in this area (step 74). It can be simple text, bitmap, graphic file, URL link, or any other media. This field is converted in a database field element by a FIELD_STORE software resident in the portal server. This field will have PDA representation that may be shown on the PDA and which can be transmitted using a minimum of bandwidth such as compressed bitmap or simple text. If there is more than one possible conversion, the program will ask the user about his choice. The user will then be able to put this field onto one of the portal pages.

Note that the following items are stored in database 34 of the portal server: the URL location and page, the field position, the last HTML page viewed as a reference for identifying modifications to the HTML page, the positioning of this field in PC mode and PDA mode including the size, the conversion mode, refresh mode and parameters, the field value itself if not included within the HTML such as a figure, and the actions allowed on this field in PDA mode such as open separately, input fields, scrolling, and numbering. For each field, templates are defined or the user can copy an existing field configuration that matches its requirement. In this way, only the URL location, field position and size need be changed.

The database 34 is either refreshed based upon HTML information included in the source page, or based upon a refresh period defined by the user, or when a browser is activated from the PDA onto this page. This refresh period may be defined only when the PDA is connected or the period may be defined permanently without regard to the connection of the PDA. It is also possible to store the current field value if the refresh is only performed at the user's request. In this case, the page presentation ein the PDA as no contact with the source web pages will be required. The refreshing of the source page only on demand by the user also avoids the requirement of sending an update when in fact there is no real change since the last update. Finally, the refreshing of the source page only on demand by the user will save bandwidth. In this regard, the portal server acts as a web cache and converter dedicated for each user. All specific fields of a portal page are then refreshed as if a connection is established with each of the related web pages upon a user request or upon a defined refresh action within the database.

The user can then continue with another field on the same web page or go onto another page of the same URL or on another URL location through steps 66 to 74 or select to work in PDA mode to (step 68). In that case, it is possible to select (step 76) either the view mode where (step 78), the positioning of not yet positioned fields may be done or existing fields position modified or may jump to the test environment and enter into emulation mode (step 80) where a representation of the PDA will be activated on which any of the web operations can be emulated in order to verify and optimize the web portal browsing. This can be done field by field or a set of fields may be predefined in PC mode and then positioned in PDA mode. The positioning (step 78) includes detailed definition for this field such as additional input field meanings, scrolling, item numbering, full screen mode, and a return action.

Figure 6:
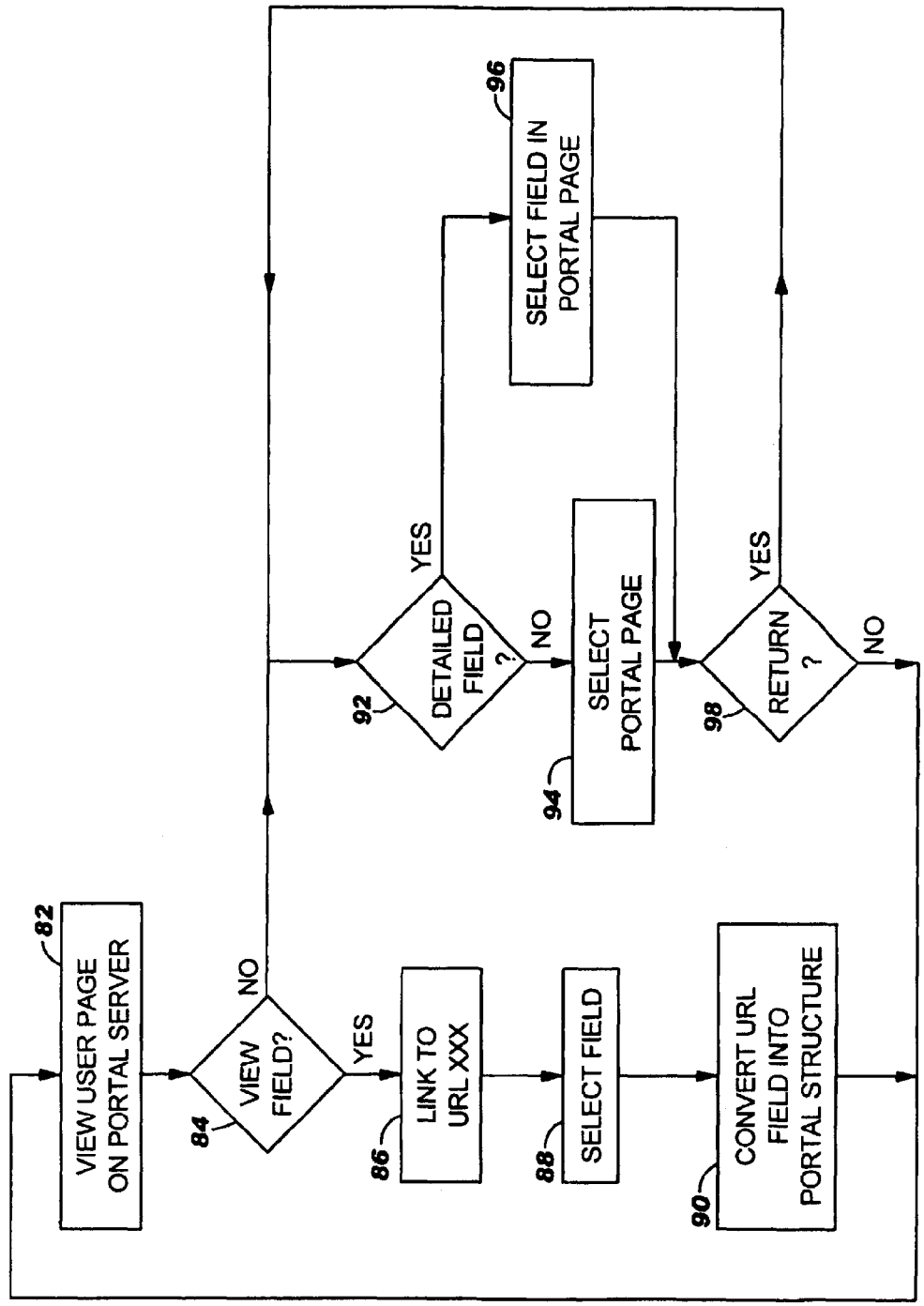
FIG. 6 is a flow chart of the steps which can be used in the PDA to display web page fields or modify them.

FIG. 6 is a flow-chart representing the steps of viewing information from the portal server page or adding an information field to the portal from the PDA. There are some preliminary actions that should be done prior to using the portal server from the PDA. A connection to the Internet network should be performed such as wireless connection using available carriers. A connection should be then performed by defining the portal server as the current URL. The portal server identifies the user either by a logon and password, or by an imbedded PDA certificate or by using a predefined id unique to this user.

After that, the user may view its homepage (step 82) and the user either can view predefined pages and fields as described in FIG. 5 and corresponding to the "no" answer to new field question (step 84), or the user can link to other URL locations (step 86) to select additional fields from a text browsing mode (step 88). 88). In this case, the user can select and copy words or lines on its text browsing mode. This information is pasted into a search field in the portal server which will perform the actions described at steps 72 and 74 in FIG. 5. At the end of the conversion, the portal server appends this field to the last defined user page or onto a new page if there is not enough room for this field on the last one. The PDA user can use this field in this mode and eventually can perform a copy and paste onto an existing PDA page. If a new page is created, on top of this new field, the user can copy and then paste any existing fields found on the other user pages.

Input fields may be used to provide manually or automatically positioning information such as co-ordinates of an input (steps 86 and 88) which will be handled by the portal server. This one will generate a request on predefined MAP or routing servers on the web in order to get a MAP or routing field which will be converted to a visible entity on the PDA (step 90) as the portal knows how to convert these fields. Tests can be made on any map using PC browser mode in order to predefine the characteristics of such MAP request.

When the use mode is selected by a "no" answer at step 84, the user can select a detailed view of a field within the current portal pager (step 92) or select one of the defined portal pages (step 94). In this case, the user selects a detailed view of a field, this enabling a new view (step 96) with only this field and a possible input field for example to perform search on the field text or associated URL. What is accessed is never directly the original web page but its copy, full or partial that is made on a portal page.

A request for the view of a portal page activates a PDA_VIEW software which uses the definition of each field of the portal page required, stored in the database, or part of this page to build dynamically the PDA representation. The PDA page is therefore first updated as defined by each field definition in the database before being transmitted to the PDA. Further field updates may be requested from the PDA by the user, for example for some permanently updated fields such as stocks value. Longer refresh time may be defined for e-mail fields. If a change is performed by the PDA, it is automatically updated on the portal server database as it is the PDA VIEW software located in this server that will contact each web server to get the necessary updates and never the PDA directly.

It is possible at any time to return (step 98) from this detailed view to the previous portal page or to another portal page thanks to a loop to step 82. Otherwise, the process links to the home page of this user and ask for disconnection. A timer will activate the disconnection after a predefined inactive time.

What is claimed is:

1. A server assisted system for accessing web page fields in which system a wireless Personal Data Assistant (PDA) communicates with an Internet network by an intermediary of a wireless Internet gateway, said server assisted system comprising:

a portal server coupled to the intermediary of the wireless Internet gateway and having a configuration for accessing resources of the Internet network, a user data base associated with said portal server, said user database containing at least identifying information selected by a user which information determines for each of said web page fields, whether data in said each of said web page fields is to be retrieved in real-time or from a pre-stored update;

portal handling means associated with said portal server, said portal handling means having a configuration for accessing said web page fields;

portal browsing means disposed in said wireless PDA, said portal browsing means comprising a configuration for browsing said web page fields and for retrieving at least one of said web page fields; and, display means disposed in said wireless PDA and having a configuration for displaying said at least one retrieved web page field in said wireless PDA.

2. A system according to claim 1, wherein said portal handling means comprises a portal real time server for accessing resources of said Internet network and for retrieving from said servers web page fields requested by said portal browsing means.

3. A system according to claim 2, wherein said portal handling means also comprise a portal back server for periodically updating defined web page fields stored in said user data base.

4. A system according to claim 3, wherein said portal real time server comprises a configuration for accessing said user data base before accessing said resources of said Internet network to determine whether said web page fields requested by said portal browsing means are within said defined web page fields being periodically updated.

5. A system according to any one of claims 1 to 4, wherein said system includes a PC web browser for accessing the resources of said Internet network and for browsing web pages selected by a user, and a portal configurator for configuring selected web page fields before transferring them to said portal server, and wherein said portal server includes a user data base builder for storing at least identifying information relating to said web page fields into said user data base.

6. A system according to any one of claims 1 to 4, wherein said PDA includes a PDA web browser for accessing the resources of said Internet network and for browsing web pages selected by a user and a PDA configurator for configuring selected web page fields before transferring them to said portal server, and wherein said portal server includes a user data base builder for storing at least the identifying information relating to said web page fields into said user data base.

7. A system according to claim 5 wherein said PC web browser further comprises means for accessing to a Uniform Resource Locator (URL) address of a selected web page, means for selecting at least one of said URL web page fields and means for converting said selected at least one URL web page field into a format for being stored in said user data base.

8. A system according to claim 6 wherein said PDA web browser further comprises means for accessing to a Uniform Resource Locator (URL) address of a selected web page, means for selecting at least one of said URL web page fields and means for converting said selected at least one URL web page field into a format for being stored in said user data base.

9. A system according to claim 6, wherein said portal browsing means in said PDA include input means for selecting at least one web page field stored in said user data base of said portal server in order to display said at least one web page field in said PDA display means.

10. A system according to claim 9, wherein said input means include means for modifying said at least one web page field being displayed by said PDA display means to view only one field among said at least one web page field previously displayed.

11. A server assisted method for accessing web page fields in which a wireless Personal Data Assistant (PDA) communicates with an Internet network by an intermediary of a wireless Internet gateway, the method comprising the steps of:

selecting different web page fields in a web page;

determining for each of said selected different web page fields, whether an update is to occur in real time or in a background process;

elected web page fields in a portal page;

serving said portal page to a portal browser; and, updating each of said selected different web page fields individually based upon said determination for each of said selected different web page fields.

\* \* \* \* \*

UNITED STATES PATENT AND TRADEMARK OFFICE
CERTIFICATE OF CORRECTION

| | | |
|---|---|---|
| PATENT NO. | : 6,920,488 B1 | Page 1 of 1 |
| APPLICATION NO. | : 09/627741 | |
| DATED | : July 19, 2005 | |
| INVENTOR(S) | : Jean Francois Le Pennec et al. | |

It is certified that error appears in the above-identified patent and that said Letters Patent is hereby corrected as shown below:

Column 8, line 28, please insert the following missing language from Claim 11 to read:

--incorporating said [s]elected web page fields in a portal page--

Signed and Sealed this

Nineteenth Day of December, 2006

JON W. DUDAS
*Director of the United States Patent and Trademark Office*